Patented Aug. 18, 1931

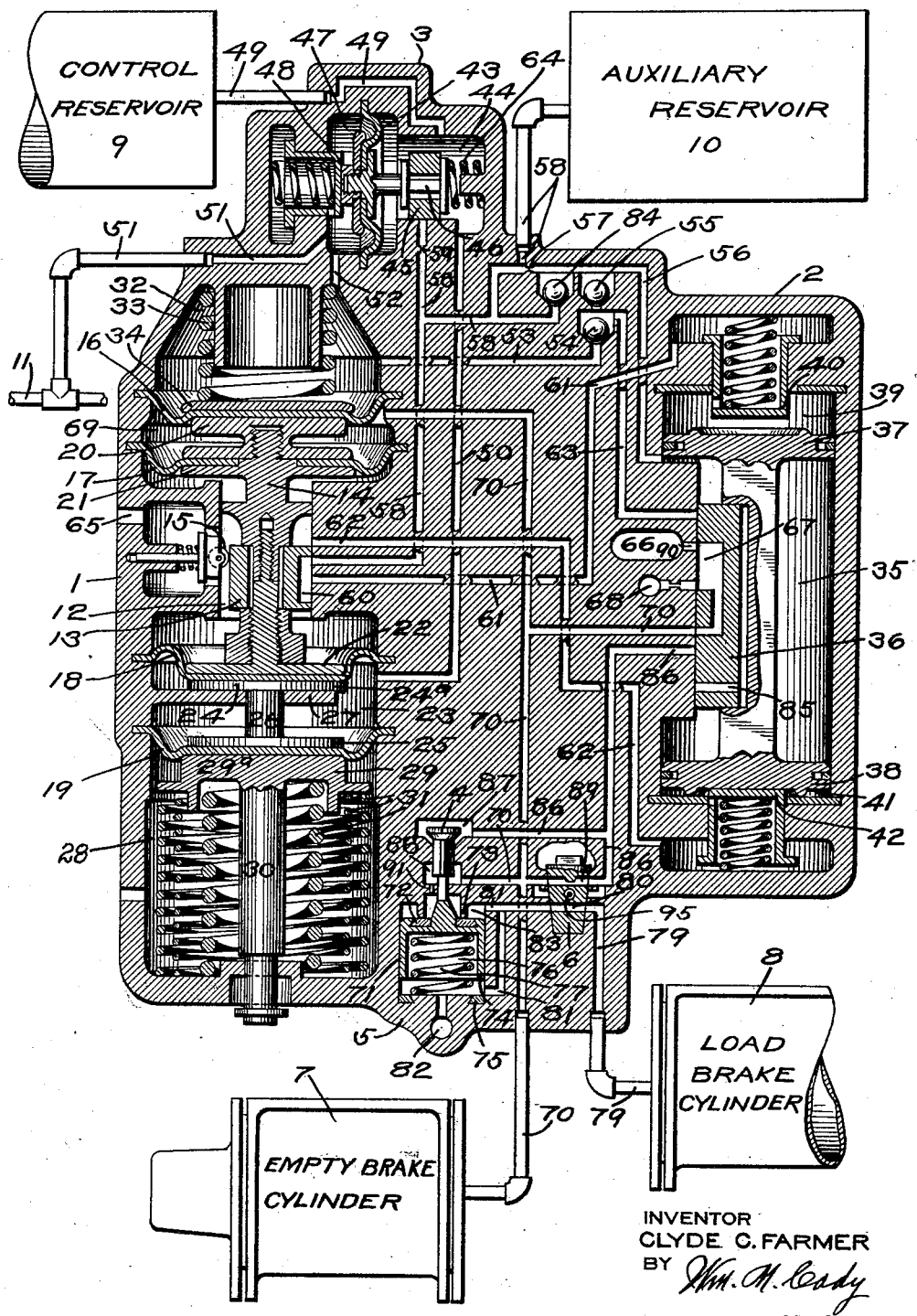

1,819,507

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed March 16, 1929. Serial No. 347,707.

This invention relates to fluid pressure brakes and has for its principal object the provision of improved valve means for controlling the application and release of the brakes.

Another object of my invention is to provide a fluid pressure brake equipment in which a predetermined brake cylinder pressure will be automatically maintained regardless of leakage of fluid under pressure from the equipment.

A further object of my invention is to provide an improved empty and load brake equipment.

Other objects and advantages will appear in the following more detailed description of my invention.

In the accompanying drawings, the single figure is a diagrammatic view of a fluid pressure brake equipment embodying my invention.

According to my invention, the brake equipment may comprise a control valve device 1, a repeater valve device 2, a charging valve device 3, a quick inshot valve 4, a load cylinder cut-in valve device 5, an empty and load change-over valve 6, an empty brake cylinder 7, a load brake cylinder 8, a control reservoir 9, an auxiliary reservoir 10 and a brake pipe 11.

In the drawings of the present embodiment of the invention, the pistons and piston rods of the empty and load brake cylinders and the mechanism connecting these rods, have not been shown since they, in themselves, form no part of this invention. However, it is to be understood that there will be a mechanism employed which will permit the piston and piston rod of the empty brake cylinder 7 to move outwardly in applying the brakes without causing the outward movement of the piston of the load brake cylinder 8. For this purpose, a mechanism of the same general character as that shown and described in United States Letters Patent No. 1,125,215, issued January 19, 1915, in the name of Walter V. Turner for empty and load brake apparatus, may be used.

The control valve device 1 may comprise a casing having a valve chamber 12 containing a control slide valve 13 which is carried by a stem 14 and is held to its seat by a spring pressed roller 15, and which is adapted to be operated by spaced flexible diaphragms 16, 17, 18 and 19 secured in the casing.

The flexible diaphragm 17 is clamped between one side of a follower 20 which has screw-threaded connection with the stem 14, and a flange 21 formed on the stem 14 adjacent its upper end, the other side of said follower engaging the underside of the flexible diaphragm 16. The lower end of the stem 14 is provided with a flange 22 which engages the upper side of the flexible diaphragm 18.

Contained in a diaphragm chamber 23 is a follower member 24 having spaced heads 24ª and 25 which are connected by a stem 26. The head 24ª engages the under side of the diaphragm 18, the head 25 engages the upper side of the diaphragm 19 and the stem 26 is slidably guided in a bracket 27 formed in the casing.

Contained in a chamber 28 at one side of the diaphragm 19 is a follower member 29 having a head portion 29ª engaging the under side of the diaphragm 19 and also having a stem 30 which is slidably guided in the casing. This follower is subject to the pressure of springs 31 interposed between the head 29ª and the casing.

A chamber 32 at the upper side of the diaphragm 16 contains a spring 33 which is interposed between the casing and a follower plate 34, which plate engages the upper side of the diaphragm 16.

The operation of the repeater valve device 2 is controlled by the operation of the control valve device 1, and it may comprise a casing having a slide valve chamber 35 containing a slide valve 36 which is adapted to be operated by pistons 37 and 38. Contained in a chamber 39 at one side of the piston 37 is a spring pressed stop 40, and contained in a chamber 41 at one side of the piston 38 is a like stop 42 either of which stops is adapted to operate the pistons 37 and 38 and slide valve 36 to lap positions when the pressure of fluid in chambers 39 and 41 are substantially equal.

The charging valve device 3 comprises a casing in which there is secured a flexible diaphragm 43, the chamber 44 at one side of the diaphragm containing a slide valve 45 which is adapted to be operated by a stem 46 secured at one end to the diaphragm 43. Contained in a chamber 47 at the other side of the diaphragm 43 is a spring pressed stop 48 with which one end of the stem 46 is adapted to engage to control the operation of the slide valve 45 as will hereinafter more fully appear.

The valve chamber 44 of the charging valve device 3 is at all times connected to the control reservoir 9 through a pipe and passage 49 and is also connected at all times to the chamber 23 between the diaphragms 18 and 19 of the control valve device 1 through a passage 50.

The brake pipe 11 is connected to the chamber 47 of the charging valve device by a pipe and passage 51 and the chamber 47 is connected to the chamber 32 of the control valve device 1 by a passage 52.

In initially charging the equipment, fluid under pressure supplied to the brake pipe 11 flows to the diaphragm chamber 47 of the charging valve device 3 through pipe and passage 51 and from thence to the diaphragm chamber 32 through passage 52. From the chamber 32 fluid under pressure flows to the slide valve chamber 35 by way of a passage 53, past ball check valves 54 and 55 and through a passage 56. From the passage 56, fluid under pressure flows to the auxiliary reservoir 10 through a choke 57 and passage and pipe 58 and also flows through a choke 59 to the seat of the slide valve 45, and further flows from the passage 58 to the piston chambers 39 and 41 of the repeater valve device by way of a cavity 60 in the control slide valve 13 and passages 61 and 62 respectively. Fluid under pressure flowing past the ball check valve 54 also flows through a passage 63 leading to the seat of the repeater slide valve 36.

When fluid under pressure is supplied to the diaphragm chamber 47 of the charging valve device, the diaphragm 43 is caused to operate to shift the stem 46 and slide valve 45 toward the right hand, uncovering the passage 58, and fluid under pressure from this passage flows into the valve chamber 44 and from thence to the control reservoir 9 through passage and pipe 49. From this chamber 44 fluid under pressure also flows to the diaphragm chamber 23 of the control valve device by way of passage 50.

Now, when the pressure of fluid in the valve chamber 44 is substantially equal to the pressure of fluid in the diaphragm chamber 47, the pressure of a spring 64, which has been compressed during the movement of the stem 46 toward the right hand, will return the stem, diaphragm 43 and valve 45 to their normal positions in which the valve 45 will lap the passage 58.

When the pressure of fluid supplied to the diaphragm chamber 23 in the control valve device and acting on the flexible diaphragm 19 is sufficient to overcome the pressure of the springs 31, the diaphragm 19 and follower member 29 will move downwardly to the positions shown in the drawings. As the diaphragm thus moves, the follower member 24 will, due to gravity, move downwardly with it.

Now when the pressure of fluid in the diaphragm chamber 32, acting on the diaphragm 16, and the pressure of fluid in the diaphragm chamber 23, acting on the diaphragm 18, are substantially equal, the pressure of the spring 33 will cause the diaphragms 16, 17 and 18, stem 14 and control slide valve 13 to move to their release positions, as shown in the drawing, in which, the slide valve uncovers the passage 62 permitting fluid under pressure to flow from the piston chamber 41 of the repeater valve device to the atmosphere by way of said passage, valve chamber 12 and an atmospheric passage 65.

Since the piston chamber 41 is thus vented, fluid under pressure in the piston chamber 39 acting on the repeater valve piston 37, causes both pistons 37 and 38, and slide valve 36 to move to their release positions as shown in the drawing.

With the repeater slide valve 36 in release position, a quick service bulb or chamber 66 is connected to atmosphere by way of a passage 90, a cavity 67 in the slide valve 36 and a choked atmospheric passage 68. With the slide valve 36 in this position, the empty brake cylinder and chamber 69 between the diaphragms 16 and 17 of the control valve device 1 are connected to atmosphere through a passage 70, cavity 67 in the repeater slide valve 36 and passage 68.

The load cylinder cut-in valve device 5 comprises a casing containing a valve piston 71 having a seat 72 adapted to seat on a seat ring 73 and having a valve 74 adapted to seat on a washer 75 mounted in the casing. Contained in the chamber 76 at one side of the valve piston, is a spring 77, the pressure of which is adapted to maintain the seat 72 normally seated against the seat ring 73. The valve piston is provided with a centrally arranged projection which is adapted to engage the lower end of the stem portion of the inshot valve 4.

With the valve piston 71 in its upper or normal position, the load cylinder 8 is connected to atmosphere by way of pipe and passage 79, passage 80 in the empty and load change-over valve 6, passage 81, chamber 76 at one side of the valve piston and atmospheric passage 82. The chamber 83 at the other side of the valve piston is connected to atmosphere by passage 81, chamber 76 and atmospheric passage 82.

Should the control reservoir 9 become overcharged with fluid under pressure, due to the brake valve device being maintained in release position for too long a time, the pressure of fluid in this reservoir may be reduced by effecting an over reduction in brake pipe pressure. Upon such a reduction in brake pipe pressure, the pressure of fluid in the chamber 47 of the charging valve device 3 is correspondingly reduced, so that the pressure of fluid in the chamber 44 acting on one side of the flexible diaphragm 43 will cause this diaphragm, stem 46 and slide valve 45 to move toward the left hand a sufficient distance that the slide valve will uncover the passage 58, thus permitting fluid under pressure from the control reservoir to reduce into the auxiliary reservoir 10 by way of passage and pipe 58. Now when the brake pipe pressure is increased in chamber 47, the diaphragm 43 will operate to return slide valve 45 to its normal lap position.

With the equipment thus charged with fluid under pressure, and it is desired to effect an application of the brakes, the usual brake valve device (not shown) is operated to service position, in which a reduction in brake pipe pressure is effected in the usual manner. Upon a reduction in brake pipe pressure, the pressure of fluid in the diaphragm chamber 32 of the control valve device 1 is also reduced, so that the pressure of fluid supplied to the diaphragm chamber 23 of the control valve device from the control reservoir 9, acting on the diaphragm 18, causes said diaphragm to move the stem 14 and control slide valve 13 upwardly to their service positions against the pressure of the spring 33.

With the control slide valve 13 in service position, the passage 61 is uncovered, so that fluid under pressure in the piston chamber 39 of the repeater valve device flows to atmosphere by way of passage 61, control valve chamber 12 and passage 65. The slide valve 13 in this position connects the passages 58 and 62, so that fluid under pressure from the auxiliary reservoir 10 is supplied to the piston chamber 41 of the repeater valve device by way of pipe and passage 58 and passage 62. From the passage 58 fluid under pressure flows past a ball check valve 84 and through passage 56 to the repeater slide valve chamber 35, the choke 57 being of no effect in restricting such flow, since the ball check valve is interposed between the choke and the chamber 35 and is by-passed by the passage. Fluid under pressure in passage 56 is prevented from flowing to the diaphragm chamber 32 of the control valve device and to the passage 63 leading to the repeater slide valve seat by the ball check valve 55.

Since the repeater piston chamber 39 is vented to the atmosphere, pressure of fluid in piston chamber 41, supplied from the auxiliary reservoir 10, causes the repeater pistons 37 and 38 and slide valve 36 to move to their uppermost or application positions. With the slide valve 36 in application position, fluid under pressure from the repeater slide valve chamber 35 is supplied to the empty brake cylinder 7 by way of a port 85 in the repeater slide valve 36, passage 86, inshot valve chamber 87, past the unseated inshot valve 4 and its fluted stem, a chamber 88 and passage and pipe 70. From the passage 86 fluid under pressure also flows through a choked passage 89 in the change-over valve 6 to the passage 70.

Fluid under pressure in the chamber 88 flows through a restricted passage 91 to the inner seated area of the valve 72 of the load cylinder cut-in valve device 5, and when the pressure of fluid acting on this area builds up to a predetermined degree, the valve piston 71 is forced downwardly against the pressure of the spring 77, unseating the valve 72 from the seat ring 73 and seating the valve 74. When the valve piston 71 moves downwardly, the inshot valve 4 moves with it and seats, so that the flow of fluid under pressure from the valve chamber 87 is closed off.

When the valve 72 unseats, fluid under pressure from the chamber 88 flows to the load cylinder 8 by way of the restricted passage 91, valve chamber 83, a passage 81, passage 80 in the change-over valve 6 and passage and pipe 79. When the valve 74 seats, communication of the passage 81 with atmosphere by way of chamber 76 and passage 82 is closed off so that there will be no loss of fluid under pressure from the load brake cylinder.

In the movement of the repeater slide valve 36 to application position, the quick service chamber 66 is connected to the brake pipe 11 through pipe and passage 51, diaphragm chamber 47 in the charging valve device, passage 52, diaphragm chamber 32 in the control valve device, passage 53 past the ball check valve 54, through passage 63, cavity 67 in the repeater slide valve 36 and passage 90. Fluid thus vented from the brake pipe causes a local reduction in brake pipe pressure, and the well known quick serial action throughout the train.

Since the brake cylinders 7 and 8 are in communication with the chamber 69 of the control valve device, pressure of fluid in these cylinders is present on one side of the diaphragm 16 and on one side of the diaphragm 17, brake pipe pressure being present on the other side of the diaphragm 16. One side of the diaphragm 18 is subject at all times to control reservoir pressure.

The effective areas of the flexible diaphragms 16, 17 and 18 are such, that when the brake cylinder pressure in chamber 69 has been increased to a predetermined degree, say for instance, two and one half pounds for every pound reduction in brake pipe pressure, the control valve device will be caused to operate to lap position.

With the control slide valve 13 in lap position, communication of the auxiliary reservoir 10 with the repeater piston chamber 41 is not cut off, and communication of the auxiliary reservoir with the repeater piston chamber 39 is established and when the pressures in these two chambers are substantially equal, the pressure of the spring actuated stop 40 causes the repeater pistons and slide valve 36 to move downwardly to their lap positions.

With the repeater slide valve 36 in lap position, the passage 86 is lapped, so that the further supply of fluid under pressure from the repeater slide valve chamber 35 to the brake cylinders is cut off. The passage 70 and atmospheric passage 68, both leading to the seat of the repeater slide valve, are lapped, so that fluid under pressure in the brake cylinders is not permitted to flow to atmosphere and the brakes are maintained applied. Since the supply of fluid under pressure to the brake cylinders is thus cut off, the pressure of fluid in the chamber 69 of the control valve device will maintain the control slide valve in lap position.

However, if by leakage, the pressures of fluid in the chamber 69 should be reduced, fluid under pressure in the chamber 23 supplied by the control reservoir 9, acting on one side of the diaphragm 18, will cause the control slide valve 13 to be returned to service position, which in turn causes the repeater valve device to operate to service position and again supply fluid under pressure from the auxiliary reservoir to the brake cylinders. The control valve device and repeater valve device continue to operate in the manner described so long as the leakage continues, and the brake cylinder pressure is maintained by fluid supplied from the auxiliary reservoir until such time as the auxiliary reservoir is reduced to the pressure of fluid in the brake pipe, when fluid under pressure from the brake pipe will maintain the brake cylinder pressure. It will thus be seen that the proper predetermined balance between brake pipe pressure and brake cylinder pressure is maintained.

If by leakage, the control reservoir pressure is reduced below a predetermined degree, for instance more than five pounds below the desired pressure, the pressure of the springs 31 of the control valve device causes the follower 29, diaphragm 19 and follower 24 to move upwardly until the head 24ª of the follower member 24 abuts against the underside of the diaphragm 18, the pressure against the diaphragm 18 being sufficient to compensate for the reduction in control reservoir pressure, so that the control slide valve will be prevented from moving to release position, in which position the brakes would be unintentionally released.

To release the brakes after a service application, the pressure of fluid in the brake pipe is increased in the usual manner, causing the control valve device 1 and repeater valve device 2 to move to their release positions, in which positions, fluid under pressure in the empty brake cylinder 7 will flow to atmosphere by way of pipe and passage 70, cavity 67 in the repeater slide valve 36 and restricted atmospheric passage 68. Fluid under pressure from the load cylinder will also flow to atmosphere by way of pipe and passage 79, passage 80 in the change-over valve 6, passage 81, chamber 83 in the load cut-in valve device 5, past the unseated valve 72, through passage 91, chamber 88, passage 70, cavity 67 in the repeater slide valve and passage 68. When the pressure of fluid in the load cylinder has been reduced to a predetermined degree, the pressure of the spring 77 causes the valve piston 71 to move to its upper position in which the valve 72 is seated and the valve 74 unseated, so that the further flow of fluid from the load brake cylinder 8 to atmosphere by way of passage 70 is cut off and the final venting of this cylinder is accomplished by way of passage 81, past the unseated valve 74 and through atmospheric passage 82.

With the equipment in release position, the auxiliary reservoir 10 and control reservoir 9 will again be charged in the manner hereinbefore described.

If, after the brakes have been applied, it is desired to effect a graduated release of the brakes, an increase in brake pipe pressure is effected which causes the control valve device to operate to its release position, which in turn causes the repeater valve device to operate to its release position. With the control valve device and the repeater valve device in release positions, fluid under pressure from the brake cylinders 7 and 8 is vented to atmosphere in the manner described until such time as the pressure of fluid in the control valve device chamber 69 is proportionately equal to the increased pressure of fluid in the chamber 32, when the pressure of fluid in the chamber 23 causes the control valve 13 to be moved upwardly to lap position in which, the repeater valve device 2 will be balanced, and the pressure of the spring pressed stop 42 will urge the repeater pistons and slide valve to lap positions, thus closing off the further discharge of fluid under pressure from the brake cylinders.

Since the quick service chamber 66 and brake cylinders 7 and 8 are connected together, and all connected to atmosphere when the repeater valve device 2 is in release position, the pressure of fluid in the quick service chamber reduces with the pressure of fluid in the brake cylinders. Should a brake application be effected before a complete release of the brakes, the reduction in brake pipe pressure, into the quick service chamber, will be less than if the chamber were completely vented, so that the action of the control valve device will be retarded to an extent dependent upon the pressure of fluid in the quick service chamber. This is especially desirable when a train is being operated down a grade, where cycling of the brakes is practiced. By maintaining the pressure of fluid in the chamber 66 substantially the same as the pressure of fluid in the brake cylinders, the action of the control valve device will be retarded to such an extent that the proper braking action will be insured, which would not be the case if the quick service chamber were completely vented each time to repeater valve device moved to release position. If the quick service chamber were so vented, then each time the repeater valve moved to service position there would be objectionable severe braking action throughout the train.

When operating empty cars, it is desirable, for well known reasons, to render the load brake cylinder inoperative, and for this purpose the change-over valve 6 is provided. To cut out the load cylinder 8, the valve 6 is rotated to a position in which the passage 80 is out of registration with the passages 79 and 81, thus closing communication of the brake cylinder 8 with the passage 86 and rendering the load brake cylinder inoperative. With the valve 6 in this position, the passage 89 will be out of registration with the passages 86 and 70, thus closing off the flow of fluid to the empty brake cylinder through the passage 89. However, when the valve is thus operated, a restricted passage 95 in the valve is brought into registration with the passages 86 and 70, so that in effecting an application of the brakes, fluid under pressure will flow from passage 86 to the empty brake cylinder 7 by way of the quick inshot valve chamber 87, past the unseated quick inshot valve 4 and its fluted stem, chamber 88 and passage and pipe 70. Now when the pressure of fluid supplied through the passage 91 and acting on the inner seated area of the valve piston 71 is sufficient to overcome the pressure of the spring 77, the valve piston will be caused to move downwardly to its lowermost position, permitting the quick inshot valve 4 to seat. With this valve 4 seated, fluid under pressure from the passage 86 is supplied to the empty brake cylinder 7 by way of the restricted passage 95 in the change-over valve 6 and passage and pipe 70.

It will here be noted that the quick inshot valve will remain unseated and permit an unrestricted flow of fluid to the empty brake cylinder 7 until such time as the brake shoes, (not shown) have engaged the usual car wheels, i. e., until the pressure of fluid acting on the inner seated area of the valve piston 71 is sufficient to overcome the upward pressure of the spring 77, at which time the valve piston 71 moves downwardly permitting the valve 4 to seat and fluid is supplied to the empty brake cylinder at a restricted rate governed by the passage 95.

The passage 95 is restricted to such an extent that it will require substantially the same time to apply the brakes when the empty brake cylinder alone is employed as when both the empty brake cylinder and load brake cylinder are employed.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, an empty brake cylinder and a load brake cylinder, of brake cylinder pressure maintaining valve means subject to a constant pressure and variations in pressures of fluid in the brake pipe and brake cylinders for controlling the supply of fluid under pressure to the brake cylinders, a valve normally unseated permitting unrestricted flow of fluid under pressure to said empty brake cylinder, and means operative when the pressure of fluid in the empty brake cylinder has been increased to a predetermined degree to establish communication through which fluid under pressure flows to the load brake cylinder and to close said valve to cause fluid under pressure to flow to the brake cylinders at a restricted rate.

2. In a fluid pressure brake, the combination with a brake pipe, an empty brake cylinder and a load brake cylinder, of brake cylinder pressure maintaining valve means subject to a constant pressure and variations in pressures of fluid in the brake pipe and brake cylinders for controlling the supply of fluid under pressure to the brake cylinders, a valve normally unseated permitting unrestricted flow of fluid under pressure of said empty brake cylinder, means operative when the pressure of fluid in the empty brake cylinder has been increased to a predetermined degree to establish communication through which fluid under pressure flows to the load brake cylinder and to close said valve to cause fluid under pressure to flow to the brake cylinders at a restricted rate, and means operative to render said load brake cylinder either operative or inoperative.

3. In a fluid pressure brake, the combination with a brake pipe, an empty brake cylinder and a load brake cylinder, of brake cylinder pressure maintaining valve means subject to a constant pressure and variations in pressures of fluid in the brake pipe and brake cylinders for controlling the supply of fluid under pressure to the brake cylinders, a valve normally unseated permitting unrestricted flow of fluid under pressure to said empty brake cylinder, means operative when the pressure of fluid in the empty brake cylinder has been increased to a predetermined degree to establish communication through which fluid under pressure flows to the load brake cylinder and to close said valve to cause fluid under pressure to flow to the brake cylinders at a restricted rate, and manually operative valve means to render said load brake cylinder either operative or inoperative.

4. In a fluid pressure brake, the combination with a brake pipe, an empty brake cylinder and a load brake cylinder, of brake cylinder pressure maintaining valve means subject to a constant pressure and variations in pressures of fluid in the brake pipe and brake cylinders for controlling the supply of fluid under pressure to the brake cylinders, and a valve piston normally preventing the flow of fluid under pressure to the load brake cylinder and subject to a predetermined empty brake cylinder pressure for permitting the flow of fluid under pressure to the brake cylinder.

5. In a fluid pressure brake, the combination with a brake pipe, an empty brake cylinder and a load brake cylinder, of brake cylinder pressure maintaining valve means subject to a constant pressure and variations in pressures of fluid in the brake pipe and brake cylinders for controlling the supply of fluid under pressure to the brake cylinders, and a valve piston normally closing off the flow of fluid under pressure to the load brake cylinder and subject to a predetermined empty brake cylinder pressure for establishing communication through which fluid under pressure is supplied to the load brake cylinder, and a manually operative valve cutting off the supply of fluid under pressure to the load brake cylinder for rendering said load brake cylinder inoperative.

6. In a fluid pressure brake, the combination with a brake pipe, a brake cylinder and a control reservoir, of a valve device subject to the opposing pressures of the brake cylinder and control reservoir for controlling the brakes, a charging valve device subject to the pressure of fluid from the brake pipe for supplying fluid under pressure to said reservoir, and subject to the pressure of a spring when the pressure of fluid in said reservoir is substantially equal to the pressure of fluid in the brake pipe for closing off the flow of fluid under pressure to said reservoir, said valve device, when the reservoir is overcharged, being operative upon an over reduction in brake pipe pressure for permitting the pressure of fluid in said reservoir to be reduced.

7. In a fluid pressure brake, the combination with a brake pipe and a brake cylinder, of a control reservoir, an auxiliary reservoir, said reservoirs being adapted to be charged with fluid under pressure from the brake pipe through a communication common to both, valve means operative to control the brakes, said valve means comprising a device having a movable abutment subject to the pressure of fluid from the control reservoir, a check valve for preventing the back flow of fluid under pressure from said reservoirs to the brake pipe, a valve device subject to the pressure of fluid in the brake pipe to supply fluid under pressure from said communication to the control reservoir and subject to the pressure of a spring when the pressure of fluid in the control reservoir is substantially equal to the pressure of fluid in the brake pipe for closing off the supply of fluid under pressure to the control reservoir.

8. In a fluid pressure brake, the combination with a brake pipe of an auxiliary reservoir and a control reservoir adapted to be charged with fluid under pressure from said brake pipe through a communication common to both, check valves for preventing the back flow of fluid under pressure from said reservoirs to the brake pipe, a valve device subject to the pressure of fluid in the brake pipe for supplying fluid under pressure from said passage to the control reservoir and subject to the pressure of a spring to close off the supply of fluid under pressure to the control reservoir when the pressure of fluid in the control reservoir is substantially equal to the pressure of fluid in the brake pipe for closing the communication of the control reservoir with the brake pipe and auxiliary reservoir.

9. In a fluid pressure brake, the combination with a brake pipe, of an auxiliary reservoir and a control reservoir adapted to be charged with fluid under pressure from said brake pipe through a communication common to both, check valves for preventing the back flow of fluid under pressure from said reservoirs to the brake pipe, a valve device subject to the pressure of fluid in the brake pipe for supplying fluid under pressure from said passage to the control reservoir and subject to the pressure of a spring to close off the supply of fluid under pressure to the control reservoir when the pressure of fluid in the control reservoir is substantially equal to the pressure of fluid in the brake pipe for closing the communication of the control reservoir with the brake pipe and auxiliary reservoir, said valve device, when the control reservoir is overcharged, being operative upon a predetermined brake pipe reduction for establishing communication through which the pressure of fluid in the control reservoir will reduce into said auxiliary reservoir.

10. In a fluid pressure brake, the combination with a brake pipe, of an auxiliary reservoir and a control reservoir adapted to be charged with fluid under pressure from said brake pipe through a communication common to both, check valves for preventing the back flow of fluid under pressure from said reservoirs to the brake pipe, a valve device subject to the pressure of fluid in the brake pipe for supplying fluid under pressure from said passage to the control reservoir and subject to the pressure of a spring to close off the supply of fluid under pressure to the control reservoir when the pressure of fluid in the control reservoir is substantially equal to the pressure of fluid in the brake pipe for closing the communication of the control reservoir with the brake pipe and auxiliary reservoir, and when the control reservoir is overcharged, being subject to the pressure of the control reservoir upon effecting an over reduction in brake pipe pressure for establishing communication through which the pressure of fluid in the control reservoir will reduce into said auxiliary reservoir.

11. In a fluid pressure brake, the combination with a brake pipe and a brake cylinder, of an auxiliary reservoir charged with fluid under pressure, valve means operative to control the supply and release of fluid under pressure to and from the brake cylinder, said valve means comprising a valve and two connected pistons, a control valve device operative to one position to subject one of said pistons to the pressure of fluid from said auxiliary reservoir to operate said valve to supply fluid under pressure to the brake cylinder, operative to another position to subject the other of said pistons to auxiliary reservoir pressure to operate said valve to discharge fluid under pressure from the brake cylinder and operative to a third position to subject both of said pistons to pressure of fluid from the auxiliary reservoir, and a spring adapted to operate said valve to close off the supply of fluid under pressure to the brake cylinder and for maintaining fluid under pressure in the brake cylinder when both of said pistons are subjected to auxiliary reservoir pressure.

12. In a fluid pressure brake, the combination with a brake pipe and a brake cylinder, of an auxiliary reservoir charged with fluid under pressure, valve means operative to control the supply and release of fluid under pressure to and from the brake cylinder, said valve means comprising a valve and two connected pistons, a control valve device having a chamber normally connected to atmosphere, and a valve in said chamber normally establishing communication through which both of said pistons are subjected to the pressure of fluid from said auxiliary reservoir and operative to vent fluid under pressure acting on one of said pistons to said chamber and to subject to the other of said pistons to auxiliary reservoir pressure to operate the first mentioned valve.

13. In a fluid pressure brake, the combination with a brake pipe and brake cylinder, of a valve device for controlling the supply of fluid under pressure to the brake cylinder, a valve mechanism comprising two diaphragms having an interposed chamber subject to the pressure of fluid in the brake cylinder and having the chamber at one side of the diaphragms subject to brake pipe pressure and the chamber at the opposite side of the diaphragms subject to atmospheric pressure, and valve means operated by said diaphragms for controlling the supply of fluid under pressure to the valve device.

14. In a fluid pressure brake, the combination with a brake pipe and brake cylinder, of a valve device for controlling the supply of fluid under pressure to the brake cylinder, a valve mechanism comprising two diaphragms having an interposed chamber subject to the pressure of fluid in the brake cylinder, said diaphragms being also subject to the opposing pressures of the brake pipe and the atmosphere, and valve means operated by said diaphragms for controlling the supply of fluid under pressure to the valve device.

15. In a fluid pressure brake, the combination with a brake pipe and brake cylinder, of a valve device for controlling the supply of fluid under pressure to the brake cylinder, a valve mechanism comprising two diaphragms having an interposed chamber subject to the pressure of fluid in the brake cylinder, said diaphragms being also subject to the opposing pressures of the brake pipe and the atmosphere, a third diaphragm subject to the opposing pressures of the atmosphere and a constant pressure, and valve means operated by said diaphragms for controlling the supply of fluid under pressure to the valve device.

In testimony whereof I have hereunto set my hand, this 26 day of February, 1929.

CLYDE C. FARMER.